United States Patent [19]
Takahashi et al.

[11] Patent Number: 6,030,197
[45] Date of Patent: Feb. 29, 2000

[54] INSERT PIN USED IN AN INSERT MOLDING APPARATUS

[75] Inventors: Kazuhide Takahashi; Sakai Yagi, both of Shizuoka, Japan

[73] Assignee: Yazaki Corporation, Tokyo, Japan

[21] Appl. No.: 09/086,495

[22] Filed: May 29, 1998

[30] Foreign Application Priority Data

Jun. 3, 1997 [JP] Japan ................................ 9-144917

[51] Int. Cl.⁷ .................................................. B29C 45/14
[52] U.S. Cl. ...................... 425/121; 264/328.12; 425/577
[58] Field of Search .................................. 425/577, 116, 425/121; 264/328.12

[56] References Cited

U.S. PATENT DOCUMENTS

| | | |
|---|---|---|
| 4,619,802 | 10/1986 | Cloeren .................................... 264/171 |
| 5,120,484 | 6/1992 | Cloeren .................................... 264/171 |
| 5,256,052 | 10/1993 | Cloeren .................................. 425/133.5 |
| 5,516,474 | 5/1996 | Cloeren ................................. 264/171.23 |

*Primary Examiner*—Harold Pyon
*Assistant Examiner*—Emmanuel Luk
*Attorney, Agent, or Firm*—Morgan, Lewis & Bockius LLP

[57] ABSTRACT

In an insert pin (1) for being pressed against a terminal (18), inserted in a mold, to hold the terminal against a flow of a resin material (19) poured into the mold, a resistance-alleviating portion (2) of a generally isosceles triangular shape, having an apex (2a) disposed on a symmetrical line (3) of a cross-section of the insert pin, is formed on and projects from a peripheral surface (1a) of the insert pin (1) in a direction of the flow.

3 Claims, 4 Drawing Sheets

INSERT PIN USED IN AN INSERT MOLDING APPARATUS

BACKGROUND OF THE INVENTION

This invention relates to an insert pin used in an insert molding apparatus which holds a terminal inserted in a mold when forming an insert molded product.

As shown in FIGS. 1 to 3, for forming an insert molded product 30, having terminals 18 therein, by a conventional method, the terminals 18 are placed within a mold 20, and insert pins 31 are inserted respectively through pin holes 21 in the mold 20, and each terminal 18 is pressed by one end of the insert pin 31. Therefore, the insert pins 31 hold the terminals 18 against the flow of a resin material 19, poured through a gate 22 in the mold 20, so that the terminals 18 will not be moved. Then, the resin material, poured into the mold 20, is cooled and cured in the sequence from the downstream-side resin material 19' kept in a stationary condition.

However, the resin material 19 has a high viscosity, and the insert pin 31 is formed into a circular cross-section, and therefore the resistance, applied from the flow of the resin material 19, is large at the downstream side 32 of the insert pin 31. As a result, a weld line (that is, a stripe extending in the direction of the flow) 33 is formed in the direction P of the flow during the molding of the insert molded product 30, and therefore there has been a possibility that a crack or the like develops in the weld line 33 during an endurance test (e.g. thermal shock test).

SUMMARY OF THE INVENTION

It is an object of this invention to provide an insert pin, used in an insert molding apparatus, which prevents a weld line from developing on an insert molded product during the insert molding of the insert molded product.

The above object has been achieved by an insert pin used in an insert molding apparatus for being pressed against a terminal, inserted in a mold, to hold the terminal against a flow of a resin material poured into the mold;

wherein a resistance-alleviating portion of a generally isosceles triangular shape, having an apex disposed on a symmetrical line of a cross-section of the insert pin, is formed on and projects from a peripheral surface of the insert pin in a direction of the flow.

In the above-mentioned construction of the insert pin according to the present invention, advantageously, the resistance-alleviating portion project towards a position downstream of the flow.

In the present invention, the resistance-alleviating portion, formed on the peripheral surface of the insert pin, projects in the direction of flow of the resin material, and has a generally isosceles triangular shape having the apex disposed on the symmetrical line of the cross-section of the insert pin. Therefore, when the resin material, poured into the mold, flows and impinges on the insert pin pressed against the terminal, disposed within the mold, to hold the terminal, the flow of the resin material will not concentrate at the outflow side, that is, the downstream side of the insert pin.

In addition to this, the above-mentioned object can be attained by an insert pin used in an insert molding apparatus for being pressed against a terminal and inserted in a mold to hold the terminal against a flow of a resin material poured into the mold, in which an contour of the insert pin in a cross-section is formed by combining:

a part of circular line; and a pair of tangential lines being respectively connected to both ends of the part of circular line and being tangent to the circular line, the tangential lines intersecting at a point which is disposed on a symmetrical line of the contour which contains a center of the circular line and extends in parallel with the flow of the resin material.

DETAILED DESCRIPTION OF THE PREFERRED EMBODIMENTS

A preferred embodiment of the present invention will now be described with reference to the drawings.

Figure 1:
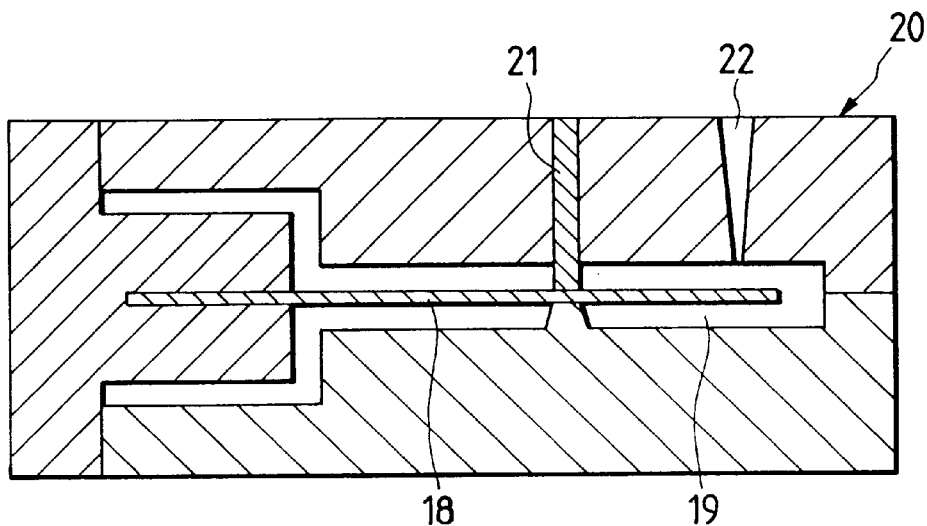
FIG. 1 is a cross-sectional view showing a condition in which a terminal is disposed in a mold in a conventional construction.
Figure 2:
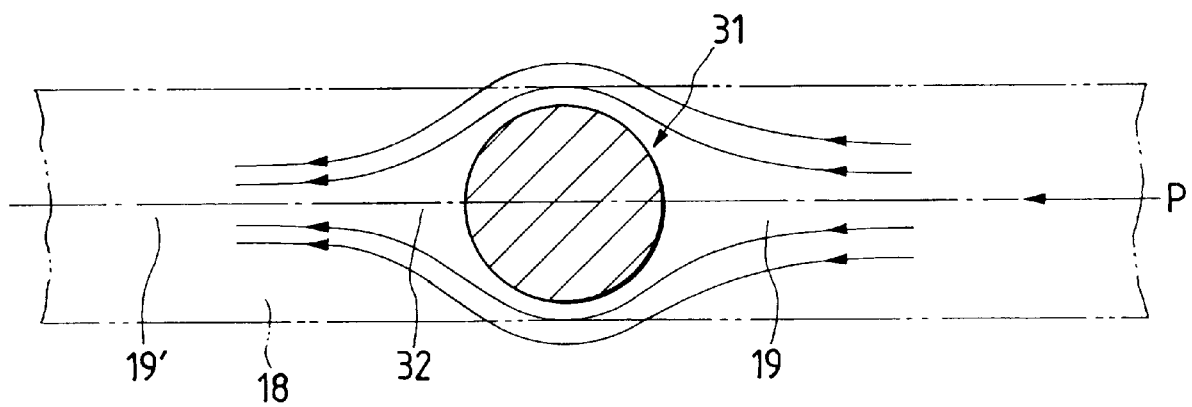
FIG. 2 is a view explanatory of the relation between the flow of a resin material and an insert pin in the conventional construction.
Figure 3:
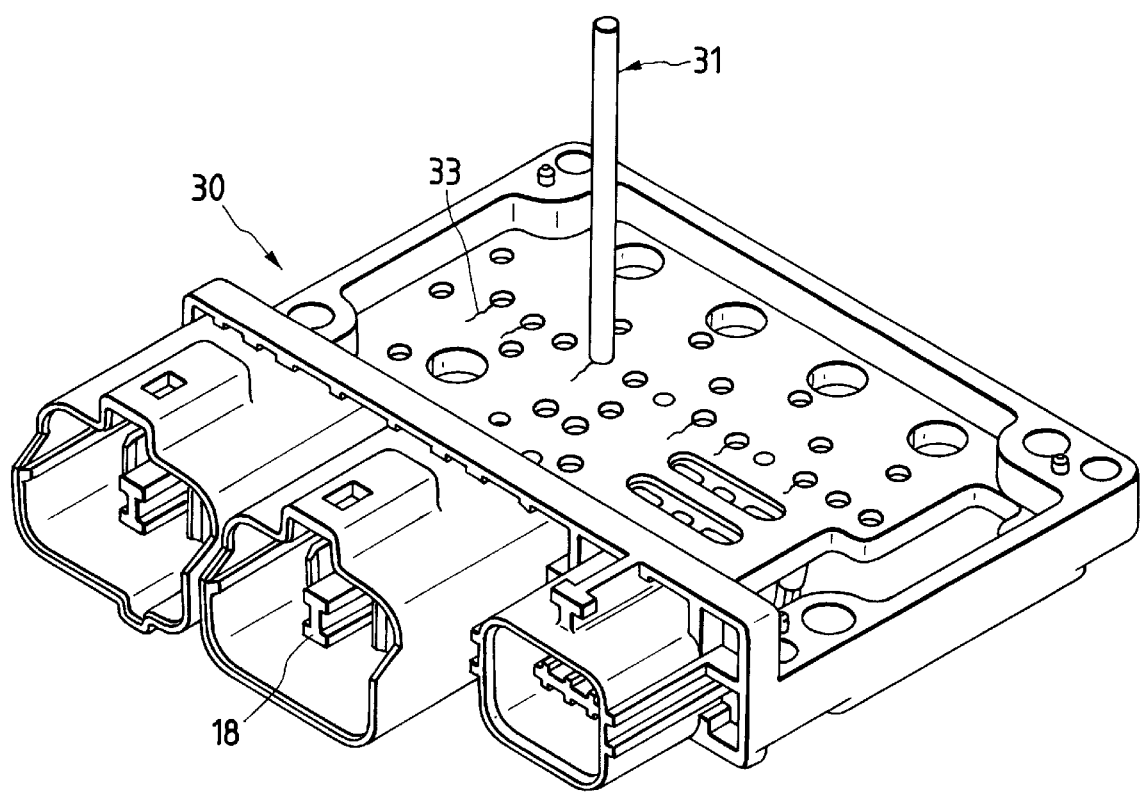
FIG. 3 is a perspective view showing a condition in which cracks are formed in a conventional insert molded product.
Figure 4:
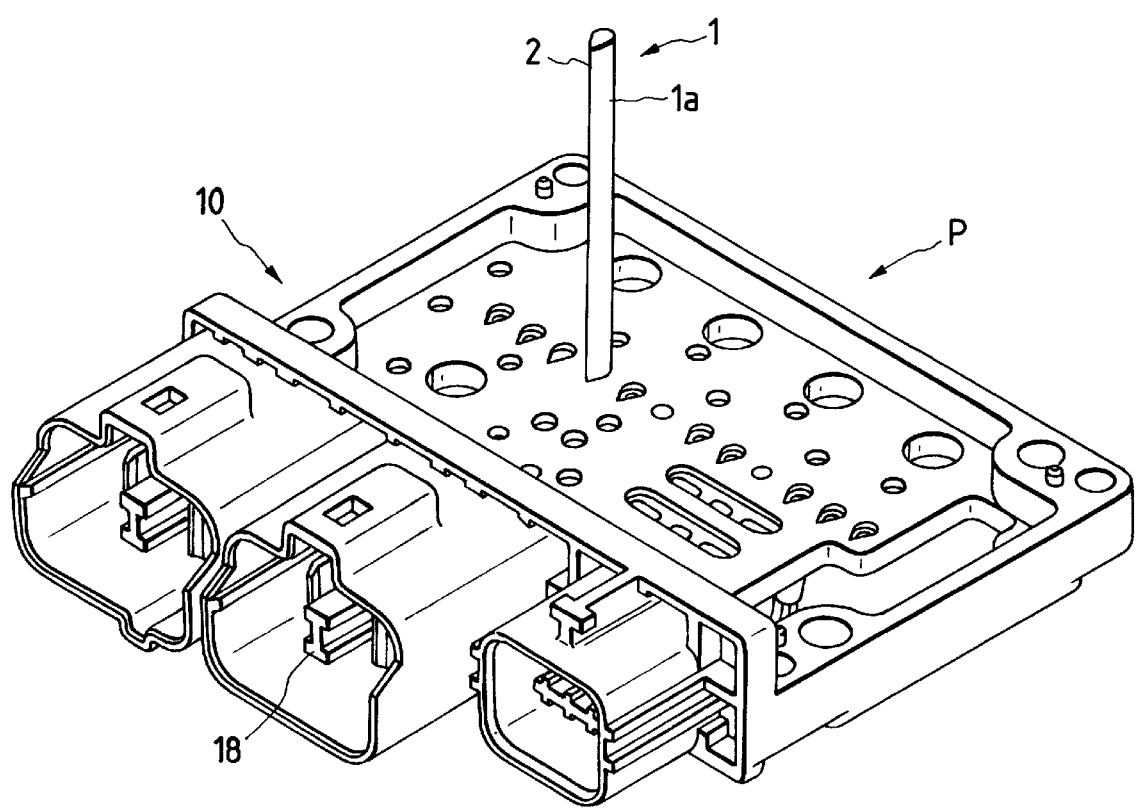
FIG. 4 is an overall perspective view showing the construction of an insert pin.
Figure 5:
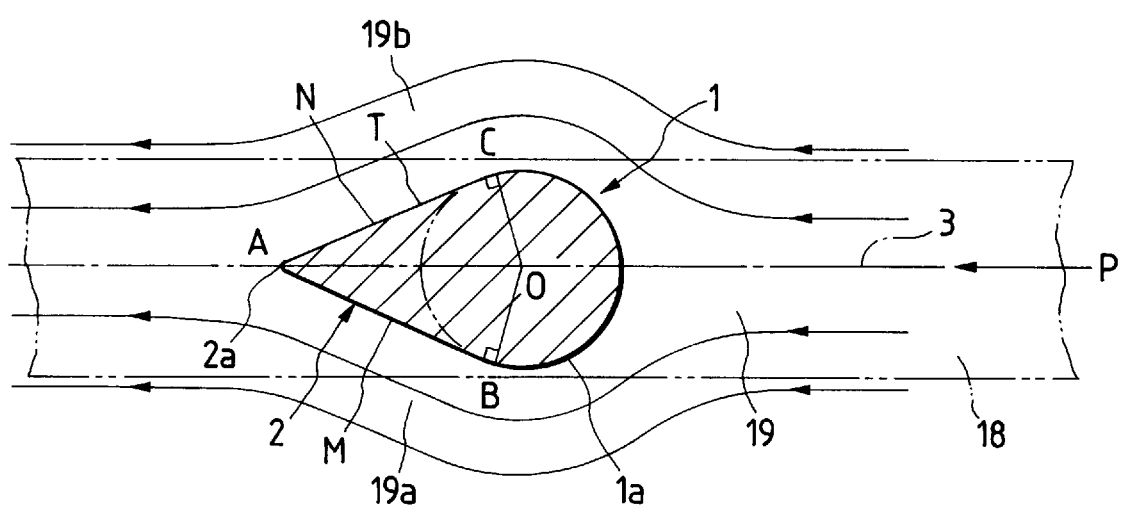
FIG. 5 is a view explanatory of the relation between the flow of a poured resin material and the insert pin.

FIGS. 4 and 5 show one preferred embodiment of an insert pin used in an insert molding apparatus according to the present invention. Those constituent members identical to those of the conventional construction will be designated by identical terms or names, respectively, and detailed description thereof will be omitted.

In FIGS. 4 and 5, with respect to the construction of this insert pin, the insert pin 1 has a resistance-alleviating portion 2 projecting from a peripheral surface 1a thereof in a direction of a flow.

The resistance-alleviating portion 2 is formed into a generally isosceles triangular shape or bird beak-shape having an apex 2a disposed on a symmetrical line 3 (with respect to which the cross-section of the insert pin is symmetrical) parallel to the direction P of the flow. More specifically, the resistance-alleviating portion 2 has the shape formed by two lines M and N which extend from a point A (which is disposed downstream of the peripheral surface 1a of the insert pin 1, and lies on the symmetrical line 3 of the cross-section) to the peripheral surface 1a in tangential relation thereto. The line M is tangent to the peripheral surface 1a at a point B, and the line N is tangent to the peripheral surface 1a at a point C. A point O is the center of the peripheral surface. The resistance-alleviating portion 2 can be provided at the upstream side of the peripheral surface 1a of the insert pin 1.

Namely, as shown in FIG. 4, a cross-section of the insert pin 1 is a generally tear-drop shape T having an contour is formed by combining: a part of circular line 1a; and a pair of tangential lines M and N being respectively connected to both ends B and C of the part of circular line 1a and being tangent to the circular line 1a, the tangential lines M and N intersecting at a point 2a which is disposed on a symmetrical line 3 of the contour which contains a center O of the circular line and extends in parallel with the flow P of the resin material.

For holding a terminal 18 using the insert pin 1, the insert pin 1 is inserted through a pin hole 21 in a mold 20 in such a manner that the resistance-alleviating portion 2 of the insert pin 1 is directed in the direction P of flow of a resin material 19. The terminal 18, inserted and placed in the mold 20, is pressed by one end of the insert pin 1, and is held against movement. In this condition, the resin material 19 is poured through a gate 22 in the mold 20.

The poured resin material 19 is divided into two flows by the peripheral surface la of the insert pin 1. The resin materials 19*a* and 19*b* thus separated from each other flow along the resistance-alleviating portion 2, and therefore the resistance due to the flows of the resin materials 19*a* and 19*b* are small at the downstream side of the insert pin 1. Namely, the flow of the resin material 19 will not concentrate at the downstream side of the insert pin 1. Therefore, a crack or the like will not develop in that portion of an insert molded product 10 corresponding to the downstream side of the insert pin 1.

As described above, in the present invention, the resistance-alleviating portion of a generally isosceles triangular shape, having the apex disposed on the symmetrical line of the cross-section of the insert pin, is formed on and projects from the peripheral surface of the insert pin in the direction of flow of the resin material. Therefore, the resistance-alleviating portion of the insert pin prevents the resin material, flowing in the mold, from concentrating at the outflow side of the insert pin. As a result, in contrast with the conventional construction, any stripe (weld line), extending from-the peripheral surface of the insert pin in the direction of the flow, will not develop during the molding of the insert molded product. Therefore, since a crack or the like will not develop in the insert molded product, the reliability of the insert molded product is enhanced.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An insert pin used in an insert molding apparatus for being pressed against a terminal, inserted in a mold, to hold said terminal against a flow of a resin material poured into said mold;

wherein a resistance-alleviating portion of a generally isosceles triangular shape, having an apex disposed on a symmetrical line of a cross-section of said insert pin, is formed on and projects from a peripheral surface of said insert pin in a direction of the flow.

2. The insert pin according to claim 1, in which said resistance-alleviating portion projects towards a position downstream of the flow.

3. An insert pin used in an insert molding apparatus for being pressed against a terminal and inserted in a mold to hold said terminal against a flow of a resin material poured into said mold, in which a contour of said insert pin has a cross-section formed by combining:

a segment of a circular line; and a pair of tangential lines being respectively connected to both ends of said segment of said circular line and being tangent to said circular line, said tangential lines intersecting at a point which is disposed on a symmetrical line of said contour which contains a center of said circular line and extends in parallel with the flow of said resin material.

* * * * *